United States Patent
Manadhata et al.

(10) Patent No.: US 11,240,263 B2
(45) Date of Patent: Feb. 1, 2022

(54) RESPONDING TO ALERTS

(71) Applicant: HEWLETT PACKARD ENTERPRISE DEVELOPMENT LP, Houston, TX (US)

(72) Inventors: Pratyusa K. Manadhata, Piscataway, NJ (US); William G. Horne, Lawrenceville, NJ (US); Tomas Sander, New York, NY (US); Manish Marwah, Palo Alto, CA (US); Tomasz Jaroslaw Bania, Mountain View, CA (US)

(73) Assignee: Micro Focus LLC, Santa Clara, CA (US)

( * ) Notice: Subject to any disclaimer, the term of this patent is extended or adjusted under 35 U.S.C. 154(b) by 251 days.

(21) Appl. No.: 15/420,521

(22) Filed: Jan. 31, 2017

(65) Prior Publication Data
US 2018/0219911 A1    Aug. 2, 2018

(51) Int. Cl.
    *H04L 29/06*     (2006.01)
(52) U.S. Cl.
    CPC .......... *H04L 63/1441* (2013.01); *H04L 63/20* (2013.01); *H04L 63/1416* (2013.01)
(58) Field of Classification Search
    CPC ............. H04L 63/1441; H04L 63/1416; H04L 63/20
See application file for complete search history.

(56) References Cited

U.S. PATENT DOCUMENTS

| | | | |
|---|---|---|---|
| 7,624,448 B2 | 11/2009 | Coffman | |
| 8,739,290 B1 | 5/2014 | Jamail et al. | |
| 9,064,210 B1 | 6/2015 | Hart | |
| 9,306,962 B1 | 4/2016 | Pinto | |
| 2002/0099579 A1 | 7/2002 | Stowell | |
| 2002/0099598 A1 | 7/2002 | Eicher | |
| 2004/0177053 A1 | 9/2004 | Donoho | |
| 2007/0209074 A1* | 9/2007 | Coffman | G06F 21/552 726/23 |
| 2008/0307525 A1 | 12/2008 | Nickle | |
| 2011/0296419 A1* | 12/2011 | Dumas | G06F 8/35 718/101 |

(Continued)

OTHER PUBLICATIONS

Manage Engine, "EventLog Analyzer is an IT Compliance & Log Management Software for SIEM", Dec. 19, 2016, Zoho Corp., 4 pages.

(Continued)

*Primary Examiner* — Anthony D Brown
*Assistant Examiner* — Rodman Alexander Mahmoudi

(57) ABSTRACT

In some examples, an alert relating to an issue in a computing arrangement is received. It is determined that the received alert is similar to a given alert in an information repository containing information of past processes performed to address respective issues, the determining comprising comparing a property associated with the received alert to a property of alerts associated with the past processes, and the information contained in the information repository comprising actions taken in the past processes to address the respective issues. Performance of a remediation action is triggered that comprises an action, identified by the information in the information repository, taken to respond to the given alert.

20 Claims, 3 Drawing Sheets

(56) References Cited

U.S. PATENT DOCUMENTS

| | | |
|---|---|---|
| 2012/0072983 A1 | 3/2012 | McCusker |
| 2013/0024937 A1 | 1/2013 | Glew |
| 2013/0024939 A1 | 1/2013 | Glew |
| 2013/0081134 A1 | 3/2013 | Glew |
| 2013/0217332 A1 | 8/2013 | Altman |
| 2014/0337086 A1 | 11/2014 | Asenjo |
| 2015/0081885 A1 | 3/2015 | Thomas et al. |
| 2015/0106867 A1 | 4/2015 | Liang |
| 2015/0163242 A1 | 6/2015 | Laidlaw et al. |
| 2015/0264077 A1 | 9/2015 | Berger et al. |
| 2015/0269383 A1* | 9/2015 | Lang ............ G06F 21/57 726/1 |
| 2015/0364022 A1 | 12/2015 | Dyell |
| 2016/0034361 A1* | 2/2016 | Block ............ H04L 63/1416 714/4.12 |
| 2016/0050225 A1 | 2/2016 | Carpenter et al. |
| 2016/0080502 A1 | 3/2016 | Yadav |
| 2016/0164893 A1 | 6/2016 | Levi |
| 2016/0352759 A1 | 12/2016 | Zhai |
| 2017/0032463 A1 | 2/2017 | Hunter |
| 2017/0063709 A1* | 3/2017 | Smith ............ H04L 67/306 |
| 2017/0116581 A1 | 4/2017 | Shah |
| 2017/0126523 A1* | 5/2017 | Chen ............ H04L 41/069 |
| 2017/0212726 A1* | 7/2017 | Gannavarapu ........ G06N 5/022 |
| 2017/0220651 A1 | 8/2017 | Mathew |
| 2017/0251013 A1* | 8/2017 | Kirti ............ H04L 63/1416 |
| 2018/0091528 A1* | 3/2018 | Shahbaz ............ H04L 63/1416 |
| 2020/0099689 A1* | 3/2020 | Ylonen ............ H04L 9/0891 |

OTHER PUBLICATIONS

Prelude, "Prelude—a Cs Product", 2016, Available at: <prelude-siem.org/projects/prelude>, 1 page.

Efflux Analytics, "Security Automation is Here," Nov. 2, 2015, 8 pages.

Bania et al., U.S. Appl. No. 15/420,417 entitled Grouping Alerts Into Bundles of Alerts, filed Jan. 31, 2017, 26 pages.

Hexadite, "Cyber analyst thinking at the speed of automation", Jan. 6, 2017, 15 pages.

HPE, "Hewlett Packard Enterprise Unveils Foundation for Next-Generation Intelligent Security Operations", Sep. 14, 2016, 6 pages.

Karim Al-Saedi et al. "Research Proposal:An Intrusion Detection System Alert Reduction and Assessment Framework Based on Data Mining", Journal of Computer Science, 2013, 6 pgs.

Marwah et al., U.S. Appl. No. 15/420,420 entitled Determining Contextual Information for Alerts, filed Jan. 31, 2017, 26 pages.

Tirath Singh, "An Effective Approach for Building Your Security Operations Center and Taking it to the Next Level", 2015, White Paper, Tata Consultancy Services Ltd., 13 pages.

* cited by examiner

RESPONDING TO ALERTS

BACKGROUND

A computing arrangement, which can include a network of computers and other types of devices, can be subject to unauthorized access or attack. Unauthorized access can be performed by users or programs. Attacks can include attacks by malware, denial-of-service attacks, and so forth. Other anomalies or issues can also exist in a computing arrangement.

BRIEF DESCRIPTION OF THE DRAWINGS

Some implementations of the present disclosure are described with respect to the following figures.

DETAILED DESCRIPTION

Figure 1:
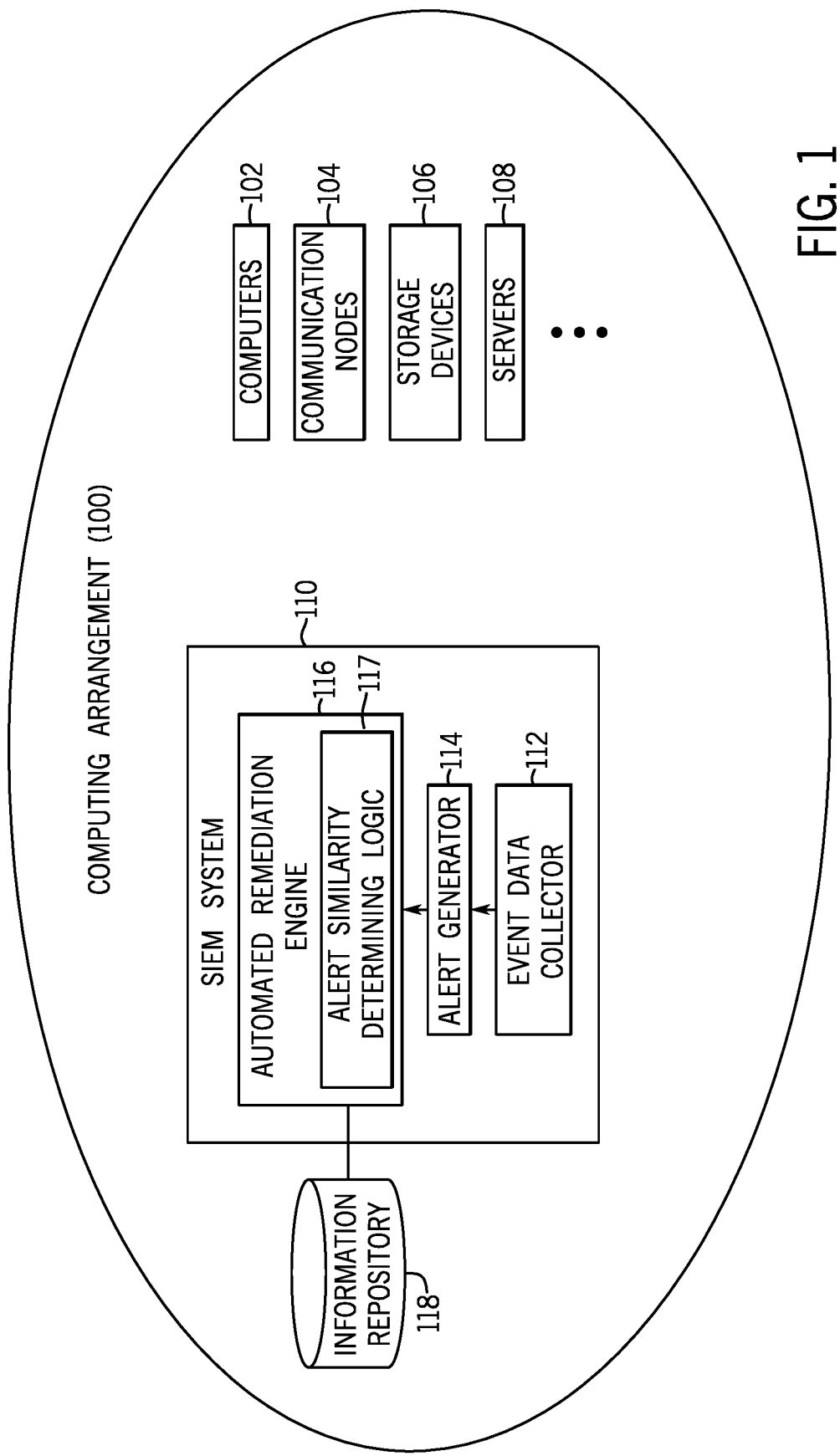
FIG. 1 is a block diagram of a computing arrangement according to some examples.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Security issues in a computing arrangement can relate to any or some combination of the following activities: unauthorized access of data, a program, or machine in the computing arrangement; an attack on the computing arrangement that is intended to cause damage or errors in components of the computing arrangement; an action that violates a specified policy, government regulation, or standards specification; fault or error during operation of a program or machine; or any other activity that can compromise the security or operational integrity of the computing arrangement. The foregoing activities can occur as a result of a user performing an unauthorized login or access of the computing arrangement, either from within a boundary of the computing arrangement or from outside the boundary of the computing arrangement, execution of malware (e.g., viruses, adware, spyware, etc.) in the computing arrangement, denial-of-service (DoS) attacks, malfunctioning programs or machines, or other activities.

A "computing arrangement" can refer to any arrangement that includes any or some combination of the following, whether at one geographic location or at multiple geographic locations: a computer (or alternatively, multiple computers), a communication node (or alternatively, multiple communication nodes), a storage device (or alternatively, multiple storage devices), a printer (or multiple printers), a server (or multiple servers), and other electronic devices. A "boundary" of the computing arrangement can be provided by systems at the edge of a network that allow electronic devices in the computing arrangement to communicate with external devices. For example, such edge systems can include any or some combination of the following: firewalls, gateways, network address translators, routers, switches, and so forth.

An enterprise can establish a security operation center (SOC) to protect the computing arrangement from security issues. An enterprise can refer to a business concern, a government agency, an educational organization, or any other entity that has a computing arrangement.

An SOC can refer to any entity (such as a department, a division, or any other organizational unit) that is responsible for protecting the computing arrangement in response to security issues. In an SOC, analysts may monitor for alerts relating to security issues in the computing arrangement, and in response to the alerts, can take actions to address the security issues.

In some examples, security alerts can be generated by a security information and event management (SIEM) system, which can refer generally to an infrastructure, made up of hardware equipment and machine-readable instructions (software and/or firmware), that is able to collect data relating to events in the computing arrangement, and to generate security alerts in response to the collected event data.

Although reference is made to security alerts in some examples, it is noted that in other examples, solutions according to some implementations can be applied to other types of alerts relating to other issues that may be present in a computing arrangement, where such issues can affect the performance of the computing arrangement or can cause the computing arrangement to exhibit errors or violate policies, rules, and so forth.

Traditionally, analysts of an SOC can perform manual investigations to respond to alerts. For example, in response to an alert, the manual investigation performed by a human analyst can include collecting more information to make sense of the alert, and to determine whether or not the alert relates to a true positive (i.e., the alert correctly indicated that a security issue has occurred) or a false positive (i.e., the alert incorrectly indicated that a security issue has occurred). The investigation can further involve hypothesis generation (to generate a hypothesis regarding why the alert occurred) and testing the hypothesis to determine if the hypothesis is correct. If the wrong hypothesis is proffered, then the analyst may have to back up and try a new hypothesis, which can be time consuming and labor intensive.

In some cases, similar alerts can result in duplicate effort to address the alerts. Such similar alerts may involve similar investigations and remediation actions to address them. If the similar alerts are processed by the same analyst, the analyst's assignment can be quite tedious as the analyst is doing the same (or similar) work multiple times. Alternatively, if the similar alerts are processed by different analysts, then the knowledge gained by one analyst in processing a first alert may not be efficiently transferred to another analyst processing a second alert.

In accordance with some implementations of the present disclosure, when processing alerts regarding issues in a computing arrangement, automated solutions are able to automatically determine that a received first alert is similar to a second alert referred to by an information repository containing information of past processes performed to address respective issues. The automated solutions can then trigger performance of a remediation action (for addressing the first alert) that includes an action, identified by the information in the information repository, taken to respond to the second alert.

FIG. 1 is a block diagram of an example computing arrangement 100, which includes computers 102, communication nodes 104, storage devices 106, servers 108, and other types of electronic devices. The computing arrangement 100 can be a data center, an information technology (IT) infrastructure, or any other type of arrangement that includes electronic devices.

The computing arrangement 100 also includes a security information and event management (SIEM) system 110, which includes an event data collector 112 to collect data relating to events associated with the various electronic devices of the computing arrangement 100. For example, events can include login events, events relating to loading of programs, events relating to execution of programs, events relating to accesses made of components of the computing arrangement 100, errors reported by machines or programs, events relating to performance monitoring of various characteristics of the computing arrangement 100, including monitoring of network communication speeds, execution speeds of programs, and so forth.

Event data collected by the event data collector 112 can include attributes associated with each event, where attributes can include any or some combination of the following: an entity (machine or program) associated with the event (e.g., the entity that triggered the event, the entity on which an activity was occurring when the event occurred, etc.), a type of operating system associated with the event, a type of application program associated with the event, a network address associated with the event, and so forth.

The event data collector 112 provides the collected event data to an alert generator 114. The alert generator 114 can apply specified rules or policies to determine whether or not, based on an event or a collection of events represented by the collected event data, a corresponding security alert is to be generated. A security alert produced by the alert generator 114 can be provided to an automated remediation engine 116 according to some implementations of the present disclosure. The automated remediation engine 116 is able to perform automated processing of a security alert, or any other type of alert, and to take action based on the processing. The automated remediation engine 116 is able to access an information repository 118, which stores information relating to past processes that have been performed to address respective issues associated with various alerts that have been encountered by the computing arrangement 100.

An information repository 118 can be implemented as a collection of information stored on a storage device or a collection of storage devices. A process that has been performed to address an issue associated with an alert can include an investigation performed by an SOC to address the issue. An investigation includes a collection of tasks that can be performed by an entity (or a number of different entities), where an entity can refer to a human analyst, a machine, or a program. By being able to leverage information in the information repository 118 regarding past processes that have been performed to address respective issues, the automated remediation engine 116 is able to determine the appropriate remediation action to take in response to a current alert produced by the alert generator 114. The automated remediation engine 116 includes an alert similarity determining logic 117 to determine that a current alert is similar to a past alert referred to by the information repository 118. The automated remediation engine 116 can select a remediation action that includes an action (obtained from the information repository 118) taken to respond to a past alert (that has been determined to be similar to the current alert. In this manner, a human analyst does not have to manually perform a time-consuming investigation that involves retrieving additional information, performing hypothesis testing, and so forth.

In some examples, a remediation action selected by the remediation engine 116 to respond to an alert can include a determination of whether the alert is a true positive alert or a false positive alert. A true positive alert is an alert that correctly indicates that an issue has occurred, while a false positive alert is an alert that incorrectly indicates that an issue has occurred. Different further actions can be taken by the automated remediation engine 116 depending upon whether the alert is determined to be a true positive alert or a false positive alert.

The automated remediation engine 116 can be implemented using a computer or a number of different computers. More generally, the automated remediation engine 116 includes a processor and a storage medium storing instructions that upon execution on the processor cause the processor to perform various tasks. Executing instructions on a processor can refer to executing the instructions on one processor, or executing the instructions on multiple processors.

Figure 2:
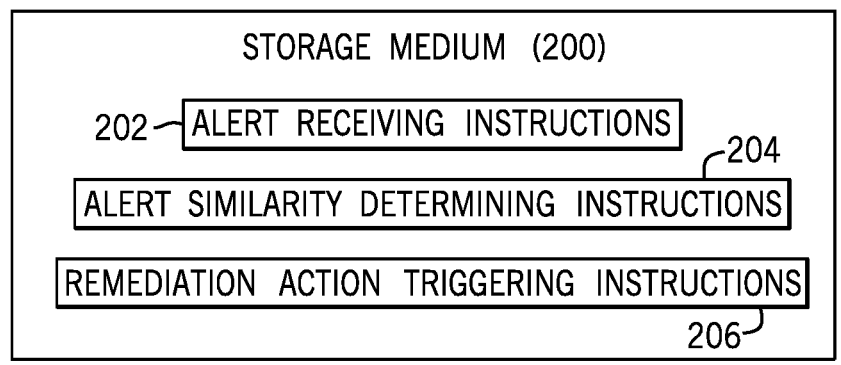
FIG. 2 is a flow diagram of a process of an automated remediation engine according to some examples.

FIG. 2 is a block diagram of a non-transitory machine-readable or computer-readable storage medium 200 storing machine-readable instructions (which can be part of the automated remediation engine 116) that upon execution cause at least one processor to perform various tasks. The machine-readable instructions include alert receiving instructions 202 to receive an alert relating to an issue in a computing arrangement, such as the computing arrangement 100. The received alert is referred to as a "current alert" that is to be processed for determining the appropriate remediation action to take.

The machine-readable instructions further include alert similarity determining instructions 204 to determine that the current alert is similar to a given (past) alert referred to by an information repository (e.g., 118 in FIG. 1) containing information of past processes performed to address respective issues. The past processes may have been performed in response to alerts. The determining of a similarity of a current alert to a past alert can include comparing a property associated with the current alert to a property of past alerts associated with the past processes referred to by the information repository 118. The information repository 118 can store information regarding actions taken in the past processes to address the respective issues associated with the past alerts.

The machine-readable instructions in the storage medium 200 further include remediation action triggering instructions 206 that can trigger performance of a remediation action to address the current alert. The remediation action is selected by the remediation action triggering instructions 206 and can include an action (obtained from the information repository 118) taken to respond to a past alert (that has been determined to be similar to the current alert).

Comparing a property associated with a current alert to a property of past alerts associated with past processes can refer to comparing one property associated with the current alert to one property of the past alerts, or to comparing multiple properties associated with the current alert to properties of the past alerts. In some examples, a distance function can be used to determine similarity between alerts. The distance function can perform a calculation based on metrics, where each metric corresponds to a property of an alert that is compared. The distance function can be based on a difference between values of a property (or multiple properties) of the alerts, a difference between a square of the values of a property (or multiple properties) of the alerts, and so forth.

The output similarity value produced by the distance function is a value that represents a degree of difference between the property (or properties) of respective alerts that are being compared. A lower value provided by the distance function can indicate that the alerts are more similar to one another, while a larger value produced by the distance function can indicate that the alerts are less similar to each other. Two alerts can be considered to be similar to each other if a similarity value produced by the distance function for the two alerts is less than a specified threshold, in some examples.

In other examples, other types of similarity functions can be employed. In such examples, a higher similarity value produced by a similarity function can indicate greater similarity, while a lower similarity value produced by the similarity function can indicate lower similarity. In such examples, alerts are considered to be similar if the similarity value produced by the similarity function is greater than a specified threshold.

Examples of properties that can be compared to determine whether alerts are similar to one another can include any or some combination of the following: a source of an alert, a type of alert, underlying events of the alerts, and tasks performed to respond to the alerts. Although specific examples of alert properties that can be compared are listed, it is noted that in other examples, other or additional properties of alerts can be compared.

In some examples, comparing the property associated with the current alert to the property of past alerts referred to by the information repository 118 can include comparing a source of the current alert to sources of the past alerts. A source of an alert can refer to an entity that caused the alert to be generated or that was involved in an event (or collection of events) that triggered the alert. The entity can include a machine, a program, or a user.

For example, the automated remediation engine 116 can indicate that the current alert is similar to a past alert referred to by the information repository 118 if the alerts are from the same source.

As another example, the automated remediation engine 116 can indicate that the current alert is similar to a past alert referred to by the information repository 118 based on the current alert and the past alert being from similar sources. Sources can be considered to be similar if the sources share a common characteristic (or common characteristics). Examples of characteristics of a source can include any or some combination of the following: an operating system, an application, a version of an application, an owner, a network on which the source is connected, a type of machine, network addresses used, domain names used, a malicious list of network addresses used, a malicious list of domain names used, and so forth. Thus, two sources can be determined to be similar if any one or some combination of the following is true: the sources run the same operating system, the sources run the same application, the sources run the same version of an application, the sources are owned by the same owner or by similar owners (e.g., owners within the same family or in the same group of an enterprise), the sources are on the same network (such as on the same subnet), the sources are the same type of machine (e.g., notebook computer, server computer, network device, printer, etc.), the sources communicate using a common set of network addresses, such as Internet Protocol (IP) addresses, the sources communicate using a common set of domain names, the sources connect to a common set of malicious (e.g., blacklisted) network addresses, the sources access a common set of malicious (e.g., blacklisted) domain names, and so forth.

In further implementations, comparing the property associated with the current alert to the property of the past alerts referred to by the information repository 118 can further include comparing a type of the current alert to types of the past alerts. Examples of different alert types can include the following, as examples: an alert type relating to malware, an alert type relating to an unauthorized login, an alert type relating to an intrusion into a network, an alert type relating to a program or machine that has crashed or has exhibited an error, and so forth.

In some examples, a taxonomy of alert types can be defined, and can be represented in a data structure that relates the different alert types. For example, the data structure can be in the form of a tree, where alert types that are related to one another can be connected in the tree. For example, a general alert type (e.g., an alert relating to malware), can have child nodes in the tree relating to more specific alert types (such as an alert type relating to a virus, an alert type relating to a ransomware, and so forth).

The following provides further examples where a source and an alert type are properties to be considered in determining whether alerts are similar For example, a current alert and a past alert can be considered to be similar if the alerts are of similar alert types that involve the same source. As noted above, similar alert types can be defined by a taxonomy of the alert types, where alert types are considered to be similar if they are related in some way by the taxonomy, such as being from the same branch of a tree representing the taxonomy or having a common ancestor in the tree. More generally, determining similarity of a current alert and past alerts can include determining a relationship of a type of the current alert to types of the past alerts in a tree or other representation of a taxonomy of alert types.

As a further example, a current alert and a past alert can be considered to be similar if the alerts are of the same alert type but are from similar sources.

Additionally, a current alert and a past alert can also be considered to be similar if the alerts are of similar alert types and are produced from similar sources.

In further implementations, similarity of alerts can be based on a comparison of events associated with the alerts. Each alert can be associated with an underlying event or an underlying collection of events. Thus, a current alert may have been produced by the alert generator 114 in response to a specific underlying event or to a specific collection of underlying events. The information repository 118 can also store information regarding an event (or a collection of events) associated with each past alert. Thus, comparing a current alert to past alerts referred to by the information repository 118 can include comparing the underlying events of the alerts. The similarity of the underlying events can be compared using characteristics of the underlying events. For example, the characteristics of the underlying events can include the same characteristics defined for sources, as listed above.

In further implementations, the determination of similarity of alerts can be based on tasks that have been performed to respond to the alerts. The information repository 118 contains information relating to past processes that have been performed to address issues associated with past alerts. Each past process includes various tasks, which can be compared to any task(s) that has (have) been taken so far to address the current alert. The task(s) that has (have) been performed so far to address the current alert can include a partial sequence of tasks.

In some examples, each task of a process to respond to an alert can be assigned an indicator to represent the task. For example, a task can be assigned a first indicator to indicate an asset management task, a second indicator to indicate a web search task, a third indicator to indicate a lookup task, and so forth. Thus, comparing the tasks of a first process (which can be the process of tasks that have been performed so far to address the current alert) and the tasks of a second process (which can be a past process referred to by the information repository 118) can be based on a comparison of a string of the indicators for the first process and the string of the indicators for the second process. The comparison of two strings of indicators can involve use of a distance function that calculates an edit distance between the strings, where an edit distance is based on a number of edits to be performed on a first string to arrive at the second string.

Alternatively, the tasks performed for a process can be represented as a tree, where each node of the tree represents a task, and a link between the nodes in the tree represents a relation between the tasks (e.g., task 1 is performed before task 2). The tree can include various hypotheses paths performed in a process responding to an alert. The trees of two processes can be compared to determine if the processes are similar.

Once the automated remediation engine 116 has determined that the current alert is similar to a given past alert referred to by the information repository 118, then the automated remediation engine 116 can determine a remediation action that is likely to address the received alert. The determined remediation action can include an action associated with the given past alert referred to by the information repository 118. This action associated with the given past alert can be part of a past process that was used to respond to the given past alert.

The past process used to respond to the given past alert can include a determination of whether the given past alert was a true positive alert or a false positive alert. Based on this determination of the past process regarding whether the given past alert is a true positive alert or false positive alert, the automated remediation engine 116 can make a determination that the current alert is a true positive alert or a false positive alert.

If the automated remediation engine 116 determines that the current alert is a true positive alert, then the automated remediation engine 116 can automatically trigger the performance of a recommended remediation action to address the issue associated with the current alert.

In the event that the automated remediation engine 116 determines that the current alert is a false positive alert, then the automated remediation action 116 can provide information to prevent generation of a future alert in response to the event (or collection of events) that triggered the current alert. For example, the information that is provided can include a rule that specifies that given the event (or collection of events) that gave rise to the current alert, the system should not generate an alert in the future based on the same event (or collection of events).

In some examples, the automated remediation engine 116 can determine, based on a comparison of the current alert to past alerts, that multiple past alerts are similar to the current alert. In such examples, a confidence score or other confidence indicator can be assigned to a recommended remediation action based on the past processes responding to the multiple past alerts that have been determined to be similar to the current alert. The confidence score can be based on the remediation outcomes of the past processes associated with the multiple past alerts. For example, the confidence score may be based on the number of the past processes, how similar the past processes are, and whether the remediation outcomes for the past processes were consistent. If there are a large number of past processes that are highly similar to each other, and all of them classified the respective alerts as false positives, then the automated remediation engine 116 can determine with high confidence that the current alert should be classified as a false positive. If, on the other hand, there are only a small number of past processes, and the past processes are not similar to each other and/or the remediation outcomes of these past processes are inconsistent, then the automated remediation engine 116 can assign a lower confidence score to the recommended remediation action.

In some examples, a confidence threshold can be defined. The automated remediation engine 116 can perform the recommended remediation action to respond to the current alert in response to the confidence score being greater than the confidence threshold. If the confidence score is less than the confidence threshold, then the automated remediation engine 116 can elect not to perform the recommended remediation action.

By using techniques or mechanisms according to some implementations of the present disclosure, the analysis to address alerts can be made to be more efficient, by reducing the amount of time and resources to process an alert. Also, increased accuracy can be achieved in determining a remediation action to take in response to an alert, since information about past processes that have been performed can be used to recommend a remediation action to take.

Figure 3:
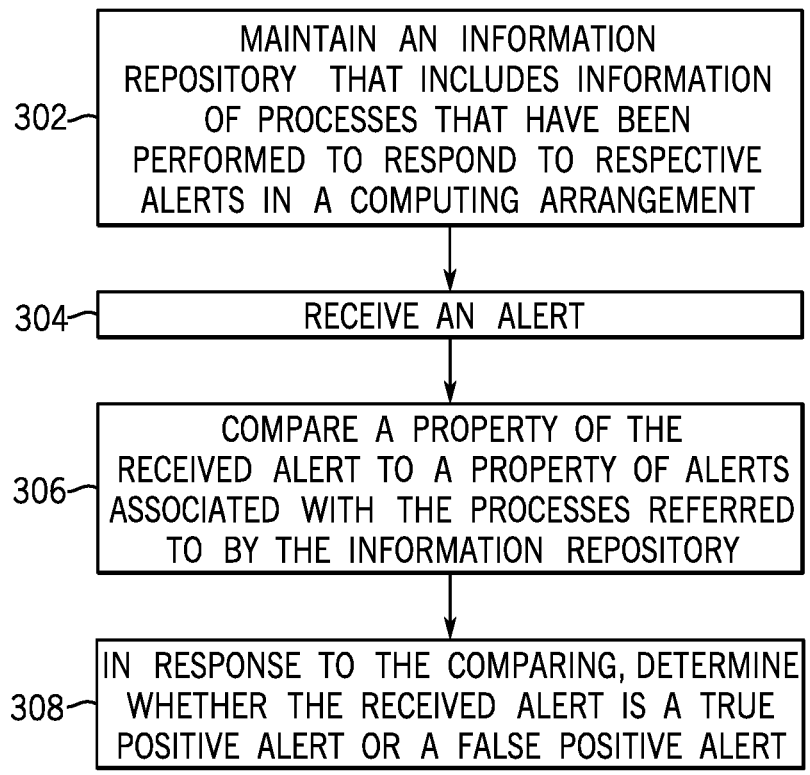
FIG. 3 is a block diagram of a storage medium storing machine-readable instructions for responding to alerts, according to some examples.

FIG. 3 is a flow diagram of a process that can be performed by the automated remediation engine 116 according to some examples. The process maintains (at 302) an information repository that includes information of processes that have been performed to respond to respective alerts in a computing arrangement. The information of the processes can include actions taken in response to the respective alerts.

The process further includes receiving (at 304) an alert. The process compares (at 306) a property of the received alert to a property of alerts associated with the processes referred to by the information repository. In response to the comparing, the process determines (at 308) whether the received alert is a true positive alert or a false positive alert.

Figure 4:
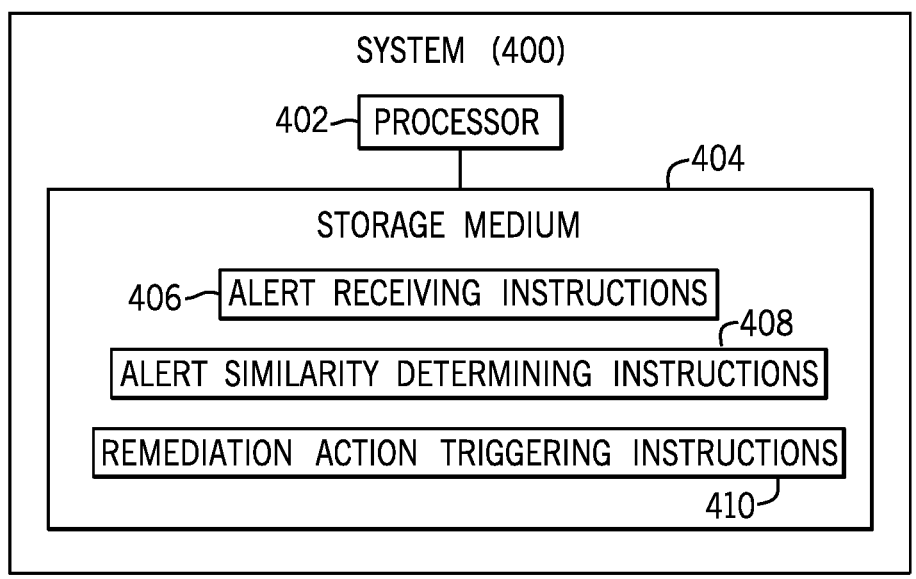
FIG. 4 is a block diagram of a system according to some examples.

FIG. 4 is a block diagram of a system 400 that includes a processor 402 (or multiple processors) and a storage medium 404 that stores machine-readable instructions that are executable on the processor 402 to perform various tasks. A processor can include a microprocessor, a core of a multi-core microprocessor, a microcontroller, a programmable integrated circuit, a programmable gate array, or another hardware processing circuit. The machine-readable instructions of the storage medium 404 include alert receiving instructions 406 to receive an alert relating to an issue in a computing arrangement. The storage medium 404 further stores alert similarity determining instructions 408 to determine that the received alert is similar to a given alert referred to by an information repository containing information of past processes performed to respond to respective alerts, where the determining includes comparing a property associated with the received alert to a property of the alerts associated with the past processes, and the information contained in the information repository includes actions taken in the past processes.

The storage medium 404 further stores remediation action triggering instructions 410 to trigger performance of a remediation action to address the issue relating to the received alert, where the remediation action includes an action, identified by the information in the information repository, taken to respond to the given alert.

The storage medium 200 (FIG. 2) or 404 (FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause at least one processor to:

receive a first alert relating to an issue in a computing arrangement;

determine that the first alert is similar to a second alert in an information repository, wherein the information repository comprises information associated with past processes performed in response to respective issues, the information comprising information associated with actions taken in the past processes to address the respective issues, wherein determining that the first alert is similar to the second alert comprises:

comparing, using a distance function, a first string to a plurality of strings, wherein:

the first string represents tasks performed in response to the first alert, each string of the plurality of strings represents a task performed in response to the second alert, and the distance function is configured to calculate an edit distance based on a respective number of edits to be performed on the first string to arrive at the plurality of strings;

in response to determining that the first alert is similar to the second alert, determine a remediation action for the issue, wherein the remediation action comprises an action identified based on the information in the information repository as having been performed in response to the second alert; and trigger performance of the remediation action.

2. The non-transitory machine-readable storage medium of claim 1, wherein determining the first alert is similar to the second alert further comprises comparing a characteristic of a source that generated the first alert to a characteristic of a source that generated the second alert.

3. The non-transitory machine-readable storage medium of claim 2, wherein the characteristic of the source that generated the first alert comprises one or more of a type of operating system run in the source that generated the first alert, a type of application run in the source that generated the first alert, a version of a program run in the source that generated the first alert, an owner of the source that generated the first alert, and a network to which the source that generated the first alert is connected.

4. The non-transitory machine-readable storage medium of claim 1, wherein determining the first alert is similar to the second alert further comprises:

comparing a relationship of a type of the first alert to a type of the second alert in a taxonomy representing alert types.

5. The non-transitory machine-readable storage medium of claim 1, wherein determining the first alert is similar to the second alert further comprises:

comparing underlying events of the first alert to underlying events of the second alert.

6. The non-transitory machine-readable storage medium of claim 1, wherein the issue comprises a security issue, and the remediation action resolves the security issue.

7. The non-transitory machine-readable storage medium of claim 1, wherein the instructions upon execution further cause the at least one processor to:

compute a confidence indicator of the remediation action, wherein triggering the performance of the remediation action is based on the computed confidence indicator.

8. The non-transitory machine-readable storage medium of claim 1, wherein the remediation action comprises:

determining the first alert is a true positive alert, and performing the action identified based on the information in the information repository.

9. The non-transitory machine-readable storage medium of claim 1, wherein the remediation action comprises:

determining the first alert is a false positive alert, and providing information to prevent generation of a future alert in response to an event that triggered the first alert.

10. A method performed by a system comprising a hardware processor, the method comprising:

maintaining an information repository comprising information associated with past processes that have been performed in response to respective issues in a computing arrangement, the information of the past processes comprising information associated with actions taken in the past processes to address the respective issues;

receiving a first alert relating to an issue in the computing arrangement;

determining that the first alert is similar to a second alert in the information repository, wherein determining that the first alert is similar to the second alert comprises:
comparing, using a distance function, a first string to a plurality of strings, wherein:
the first string represents tasks performed in response to the first alert,
each string of the plurality of strings represents a task performed in response to the second alert, and
the distance function is configured to calculate an edit distance based on a respective number of edits to be performed on the first string to arrive at the plurality of strings;
in response to determining that the first alert is similar to the second alert, determine a remediation action for the issue, wherein the remediation action comprises an action identified based on the information in the information repository as having been performed in response to the second alert; and
performing the remediation action.

11. The method of claim 10, further comprising:
determining the first alert is a false positive alert;
in response to determining the first alert is a false positive alert, performing the remediation action by providing information to prevent generation of a future alert in response to an event that triggered the first alert.

12. A system comprising:
a processor; and
a non-transitory storage medium storing instructions executable on the processor to:
receive a first alert relating to an issue in a computing arrangement;
determine that the first alert is similar to a second alert in an information repository, wherein the information repository comprises information associated with past processes performed in response to respective issues, the information comprising information associated with actions taken in the past processes to address the respective issues, wherein determining that the first alert is similar to the second alert comprises:
comparing, using a distance function, a first string to a plurality of strings, wherein:
the first string represents tasks performed in response to the first alert,
each string of the plurality of strings represents a task performed in response to the second alert, and
the distance function is configured to calculate an edit distance based on a respective number of edits to be performed on the first string to arrive at the plurality of strings;
in response to determining that the first alert is similar to the second alert, determine a remediation action for the issue, wherein the remediation action comprises an action identified based on the information in the information repository as having been performed in response to the second alert; and
trigger performance of the remediation action.

13. The system of claim 12, wherein determining the first alert is similar to the second alert further comprises comparing properties associated with the first alert to properties associated with the second alert, wherein the properties associated with the first alert comprise one or more of a type of the first alert and underlying events giving rise to the first alert.

14. The non-transitory machine-readable storage medium of claim 1, wherein determining the first alert is similar to the second alert further comprises:
comparing a program of a source that generated the first alert to programs of sources that generated the second alert.

15. The non-transitory machine-readable storage medium of claim 14, wherein the program of the source that generated the first alert comprises an operating system and the programs of the sources that generated the second alert comprise operating systems, and wherein comparing the program of the source that generated the first alert to the programs of the sources that generated the second alert comprises comparing the operating system of the source that generated the first alert to the operating systems of the sources that generated the second alert.

16. The non-transitory machine-readable storage medium of claim 1, wherein determining the first alert is similar to the second alert further comprises:
comparing a domain name of a source that generated the first alert to domain names of sources that generated the second alert.

17. The method of claim 10, wherein determining the first alert is similar to the second alert comprises comparing a domain name of a source that generated the first alert to domain names of sources that generated the second alert.

18. The system of claim 12, wherein determining the first alert is similar to the second alert further comprises comparing properties associated with the first alert to properties associated with the second alert, wherein the comparing the properties associated with the first alert to the properties associated with the second alert comprises comparing a network address of a source that generated the first alert and network addresses of sources that generated the second alert.

19. The non-transitory machine-readable storage medium of claim 1, wherein the task performed in response to the first alert comprise a partial sequence of tasks performed in response to the first alert.

20. The system of claim 12, wherein determining the first alert is similar to the second alert further comprises comparing properties associated with the first alert to properties associated with the second alert, wherein comparing the properties associated with the first alert to the properties of the second alert comprises comparing a domain name of a source that generated the first alert to domain names of sources that generated the second alert.

* * * * *